(12) United States Patent
Lee et al.

(10) Patent No.: US 8,687,686 B2
(45) Date of Patent: Apr. 1, 2014

(54) 3D CONTENTS DATA ENCODING/DECODING APPARATUS AND METHOD

(75) Inventors: Seung-Wook Lee, Daejon (KR); Bonki Koo, Daejon (KR); Dai-Yong Kim, Seoul (KR); Kyoung-Soo Son, Seoul (KR); Euee-Seon Jang, Seoul (KR)

(73) Assignees: Electronics and Telecommunications Research Institute, Daejeon (KR); Industry-University Cooperation Foundation Hanyang University, Seoul (KR)

( * ) Notice: Subject to any disclaimer, the term of this patent is extended or adjusted under 35 U.S.C. 154(b) by 350 days.

(21) Appl. No.: 12/760,217

(22) Filed: Apr. 14, 2010

(65) Prior Publication Data
US 2010/0266217 A1 Oct. 21, 2010

(30) Foreign Application Priority Data

Apr. 15, 2009 (KR) ........................ 10-2009-0032572

(51) Int. Cl.
*H04N 11/02* (2006.01)
*H04N 7/14* (2006.01)
(52) U.S. Cl.
USPC .......................................... 375/240; 382/238
(58) Field of Classification Search
None
See application file for complete search history.

(56) References Cited

U.S. PATENT DOCUMENTS

| | | | | |
|---|---|---|---|---|
| 6,744,914 B1* | 6/2004 | Rubbert et al. | ............... | 382/154 |
| 7,203,942 B2* | 4/2007 | Lafruit et al. | ................. | 718/100 |
| 8,121,461 B2* | 2/2012 | Ikeda et al. | ................... | 386/248 |
| 8,135,066 B2* | 3/2012 | Harrison et al. | ......... | 375/240.16 |
| 8,180,165 B2* | 5/2012 | Lu et al. | ........................ | 382/236 |
| 2005/0094731 A1* | 5/2005 | Xu et al. | ................... | 375/240.19 |
| 2006/0153289 A1* | 7/2006 | Choi et al. | ............... | 375/240.01 |
| 2007/0019740 A1* | 1/2007 | Budagavi | ................. | 375/240.25 |
| 2008/0117965 A1* | 5/2008 | Vysotsky et al. | ........ | 375/240.01 |
| 2009/0245347 A1* | 10/2009 | Lee et al. | ................. | 375/240.01 |

OTHER PUBLICATIONS

Vetro et al, "3D TV Content Storage and Transmission", IEEE Transaction on Broadcasting—Special Issue on 3D-TV Horizon: Contents, Systems and Visual Perception, Jan. 2011, pp. 1-12.*
Cristoph Fehn, "Depth-Image-Based Rendering (DIBR), Compression and Transmission for a New Approach on 3D-TV", Proc. SPIE Conference on Stereoscopic Displays and Virtual Reality Systems XI, San Jose, CA, USA, pp. 93-104—specifically, pp. 101-102, Section 6 and Figure 5.*
Pourazad et al, "An H.264-based Video Encoding Scheme for 3D TV", 14th European Signal Processing Conference (EUSIPCO 2006), Florence, Italy, Sep. 4-8, 2006.*
Galpin et al, "Efficient and Scalable Video Compression by Automatic 3D Model Building using Computer Vision", 2004.*
Vetro et al, "3D TVContent Storage and Transmission", IEEE Transaction on Broadcasting—Special Issue on 3D-TV Horizon: Contents, Systems and Visual Perception, Jan. 2011, pp. 1-12.*
Seungwook Lee et al., "International Organisation for Standardisation Organisation Internationale De Normalisation ISO/IEC JTC1/SC29/WG11 Coding of Moving Pictures and Audio", ISO/IEC JTC1/SC29/WG11 M16403, Apr. 2009.

* cited by examiner

*Primary Examiner* — Jay Patel
*Assistant Examiner* — Reza Aghevli
(74) *Attorney, Agent, or Firm* — Kile Park Reed & Houtteman PLLC

(57) ABSTRACT

A 3D contents data encoding method includes receiving a plurality of primitive data contained in 3D contents data, and encoding each of the received primitive data in accordance with a predetermined encoding order for the primitive data.

10 Claims, 7 Drawing Sheets

3D CONTENTS DATA ENCODING/DECODING APPARATUS AND METHOD

CROSS-REFERENCE(S) TO RELATED APPLICATIONS

The present application claims priority of Korean Patent Application No. 10-2009-0032572, filed on Apr. 15, 2009, which is incorporated herein by reference in its entirety.

BACKGROUND OF THE INVENTION

1. Field of the Invention

Exemplary embodiments of the present invention relate to a three-dimensional (3D) contents data encoding/decoding method and apparatus; and, more particularly, to a method and apparatus for encoding/decoding 3D contents data universally.

2. Description of Related Art

Currently, a triangular mesh is widely used as a method for representing 3D contents in the computer graphics field. A triangular mesh image having a non-uniform structure includes geometry information of vertexes forming a triangle and connectivity information between the vertexes, and has a larger amount of data than a two-dimensional image having a uniform structure.

Recently, the 3D graphics field has been frequently used. However, the use range of the 3D graphics field is limited because the amount of 3D contents data is huge as described above. Accordingly, demand for a method for encoding 3D contents effectively has been increasing. Recently, research for encoding 3D contents effectively has been actively conducted.

In the Moving Picture Expert Group-4 (MPEG-4)—3 Dimensional Graphics Compression (3DGC) field, a compression standard called Animation Framework eXtension (AFE) has been established. In the AFE, a large number of techniques including 3DMC/3DMCe, WSS, MeshGrid, IC, BBA, SC3DMC and so on are used.

The 3DMCe which is known most widely is a tool for encoding mesh data, but cannot encode 3D contents data including animation information. Animation information may be encoded by using an animation encoding tool such as the BBA. However, since the BBA cannot encode mesh data, the BBA cannot encode 3D contents data including both of mesh data and animation data. That is, when 3D contents data including both of mesh data and animation data are to be encoded to generate one encoded file, the 3DMCe and the BBA cannot be used at the same time. The mesh data and the animation data should be encoded by using the 3DMCe and the BBA, respectively.

Therefore, there is demand for a method capable of providing a new encoding framework in which existing encoding techniques are integrated is required to encode 3D contents data universally and effectively.

SUMMARY OF THE INVENTION

An embodiment of the present invention is directed to a 3D contents data encoding/decoding method and apparatus, which is capable of encoding and decoding graphic data included in 3D contents data together.

Another embodiment of the present invention is directed to a 3D contents data encoding/decoding method and apparatus, which is capable of encoding and decoding 3D contents data using unit codecs depending on user's setting.

Another embodiment of the present invention is directed to a 3D contents data encoding/decoding method and apparatus, which is capable of generating a plurality of primitive data to encode and decode 3D contents data.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a 3D contents data encoding method includes: receiving a plurality of primitive data contained in 3D contents data; and encoding each of the received primitive data in accordance with a predetermined encoding order for the primitive data.

In accordance with another embodiment of the present invention, a 3D contents data encoding method includes: receiving encoding setting information which indicates an encoding order for a plurality of primitive data contained in 3D contents data; and configuring an encoder based on the encoding setting information by using unit codecs which are used to encode the respective primitive data in accordance with the encoding order.

In accordance with another embodiment of the present invention, a 3D contents data encoding method includes: receiving primitive data setting information; parsing 3D contents data in accordance with the received primitive data setting information; and generating a plurality of primitive data for the 3D contents data, depending on the parsing result.

In accordance with another embodiment of the present invention, a 3D contents data decoding method includes: receiving a plurality of encoded primitive data for 3D contents data and unit codec information which indicates unit codecs used to encode the encoded primitive data in accordance with a predetermined encoding order; and decoding the encoded primitive data using the unit codec information.

In accordance with another embodiment of the present invention, a 3D contents data decoding method includes: receiving unit codec information which indicates unit codecs used to encode a plurality of primitive data for 3D contents data in accordance with a predetermined encoding order; and configuring the unit codecs as a decoder based on the unit codec information.

DESCRIPTION OF SPECIFIC EMBODIMENTS

Different from 2D contents data, 3D contents data generally include many primitive data such as mesh data, connectivity information data, animation data, and script data. Currently, a codec following the AFX standard can encode or decode only specific primitive data. Therefore, when animation data is included in 3D contents data containing only mesh data, a codec for encoding mesh data cannot be used for encoding 3D contents data including mesh data and animation data.

In a 3D contents data encoding method in accordance with an embodiment of the present invention, primitive data included in 3D contents data are extracted, and encoding or decoding is performed by using a codec corresponding to each of the primitive data. Therefore, the 3D contents data including the plurality of primitive data may be encoded or decoded as one file. That is, in the 3D contents data encoding method in accordance with the embodiment of the present invention, the 3D contents data are encoded by using unit codecs corresponding to the respective primitive data included in the 3D contents data. Such unit codecs may be configured in accordance with a predetermined encoding order.

In accordance with the embodiment of the present invention, although animation data is included in 3D contents data including only mesh data, the mesh data and the animation data may be extracted from the 3D contents data, and the mesh data and the animation data may be encoded separately. Therefore, different types of graphic data included in the 3D contents data may be encoded together.

Meanwhile, a 3D contents data decoding method in accordance with another embodiment of the present invention also performs decoding for each primitive data, as in the encoding method.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Figure 1:
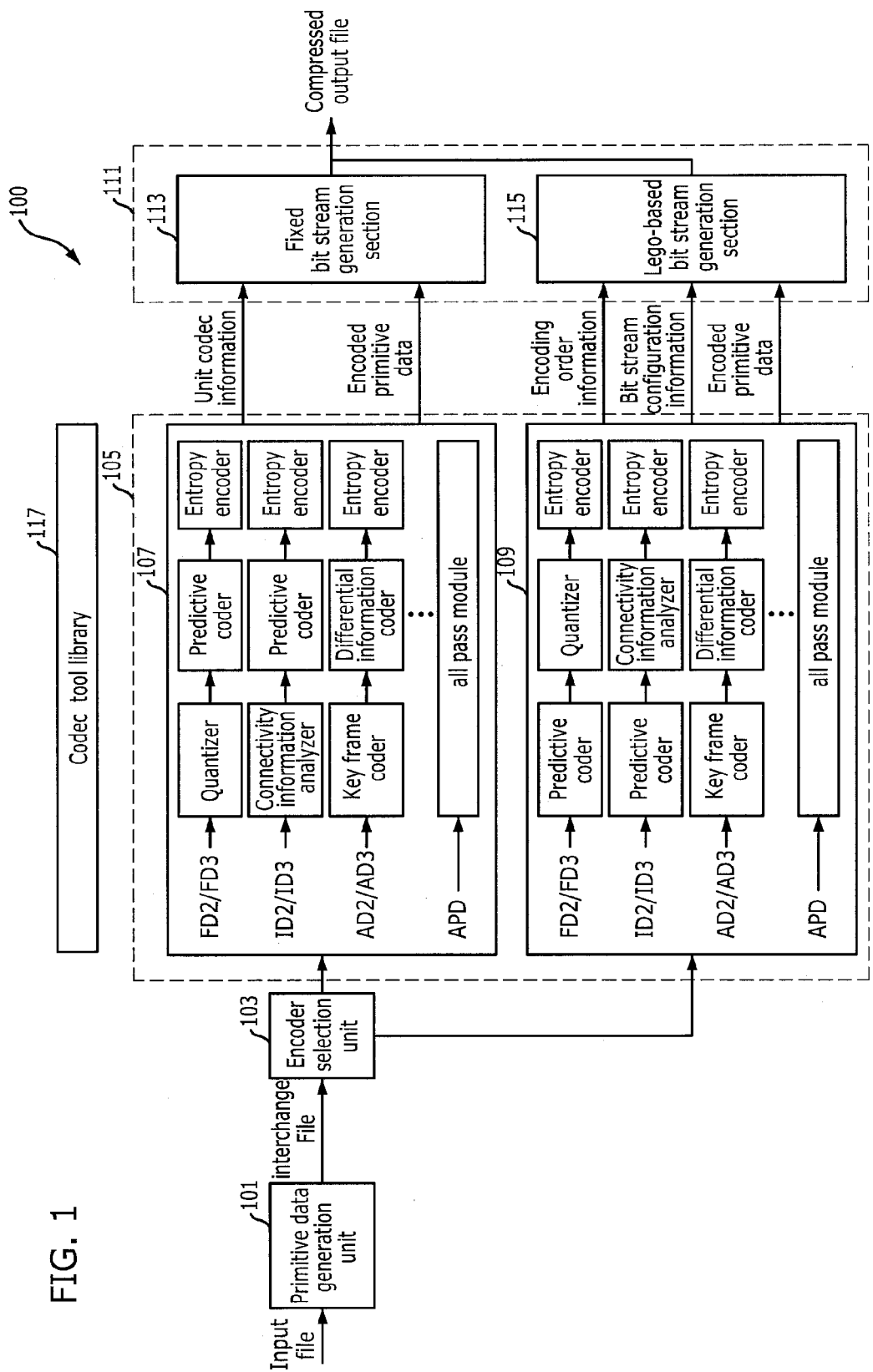
FIG. 1 is a diagram explaining a 3D contents data encoding apparatus 100 in accordance with an embodiment of the present invention.

FIG. 1 is a diagram explaining a 3D contents data encoding apparatus 100 in accordance with an embodiment of the present invention.

Referring to FIG. 1, the 3D contents data encoding apparatus 100 in accordance with the embodiment of the present invention includes a primitive data generation unit 101, an encoder selection unit 103, an encoder 105, and a bit stream generation unit 111. The encoder 105 includes a fixed codec 107 and a Lego-based codec 109, and the bit stream generation unit 111 includes a fixed bit stream generation section 113 and a Lego-based bit stream generation section 115.

The primitive data generation unit 101 is configured to receive an input file, that is, 3D contents data to generate a plurality of primitive data. The primitive data generation unit 101 may parse the 3D contents data to generate an interchange file including the plurality of primitive data.

At this time, the primitive data generation unit 101 may generate the plurality of primitive data depending on user's setting. For example, the plurality of primitive data may include 2D data, 3D data, animation data, and non-encoded data which are contained in 3D contents data. That is, the plurality of data contained in the 3D contents data may be converted into the plurality of primitive data depending on the user's setting. As the plurality of primitive data are generated depending on the user's setting, the Lego-based codec 109 which will be described below may configure unit codecs corresponding to the primitive data depending on the user's setting.

More specifically, the 2D data may include 2D float data FD2 and 2D integer data ID2, and 3D data may include 3D float data FD3 and 3D integer data ID3. Furthermore, the animation data may include 2D animation data AD2 and 3D animation data AD3. Data of all may be types included in graphics data may be primitive data.

For example, the 2D float data may include texture coordinates, the 2D integer data may include texture indexes, the 3D float data may include vertex coordinates or normal vectors, the 3D integer data may include coordinate indexes, the 2D animation data may include 2D animation key values, and the 3D animation data may include 3D animation key values.

The non-encoded data refers to data which does not require encoding such that a loss by encoding does not occur in 3D contents data. The non-encoded data is inputted to the encoder 105 which will be described below, but outputted without being encoded. For example, the non-encoded data may include light information or event script information.

The encoder selection unit 103 is configured to transfer the interchange file to the fixed codec 107 or the Lego-based codec 109. The encoder selection unit 103 may transfer the interchange file to the fixed codec 107 or the Lego-base codec 109 depending on user's setting.

As described above, the encoder 105 includes the fixed codec 107 and the Lego-based codec 109. The fixed codec 107 and the Lego-based codec 109 perform encoding for the respective primitive data by using unit codecs which are used in accordance with an encoding order. However, the fixed codec 107 and the Lego-based codec 109 have the following difference from each other.

The fixed codec 107 is configured to encode the primitive data using the unit codecs in accordance with an encoding order based on a predetermined encoding technique. Therefore, a user cannot change the encoding order arbitrarily or cannot omit an intermediate encoding step.

For example, the fixed codec 107 may encode the 2D and 3D float data in order of quantization, predictive coding, and entropy coding. Furthermore, the fixed codec 107 may encode the 2D and 3D integer data in order of connectivity information analysis, predictive coding, and entropy coding. Furthermore, the fixed codec 107 may encode the 2D and 3D animation data in order of key frame coding, differential information coding, and entropy coding. Here, the respective steps of one encoding order for data correspond to the respective steps of another encoding order for data.

On the other hand, the Lego-based codec 109 encodes the primitive data using unit codecs in accordance with an encoding order which is changed depending on user's setting. Therefore, the Lego-based codec 109 may perform the encoding in accordance with an encoding order which is arbitrarily changed by a user, or may omit an intermediate encoding step. That is, the Lego-based codec 109 may perform the encoding in accordance with a different order from the encoding order of the fixed codec 107, and Lego means that the encoding order may be configured in an arbitrary manner like Lego blocks.

For example, the Lego-based codec 109 may encode the 2D and 3D float data in order of predictive coding, quantization, and entropy coding. Furthermore, the Lego-based codec 109 may encode the 2D and 3D integer data in order of predictive coding, connectivity information analysis, and entropy coding. Furthermore, the Lego-based codec 109 may encode the 2D and 3D animation data in order of key frame coding, differential information coding, and entropy coding.

Meanwhile, the fixed codec 107 may select proper unit codecs from a codec tool library 117 to configure an encoder. For example, in order to encode the primitive data which is the 3D float data, the fixed codec 107 may receive a quantization unit codec A, a predictive coding unit codec B, and an entropy coding unit codec C from the codec tool library 117 and configure an encoder. Furthermore, the fixed code 107 may generate unit codec information indicating the unit codecs which are used in accordance with the encoding order, in order to perform decoding.

Furthermore, the fixed codec 107 may select proper unit codecs from a user codec tool library which is not illustrated. At this time, since codecs included in the user codec tool library need to be matched with a standard to facilitate access for encoding and decoding, the codecs need to be authenticated. After the authentication, the codecs may be included in the codec tool library 117. However, when the access for encoding and decoding is easy to obtain to the user codec tool library, the authentication is not necessarily performed. In this case, geometry information about the user codec tool library may be provided together.

The Lego-based codec 109 may also select proper unit codecs from the codec tool library 117 or the user codec tool library to configure an encoder. However, since the unit codecs of the Lego-based codec 109 are configured depending on user's setting, the Lego-based codec 109 may generate encoding order information indicating an encoding order depending on the user's setting. Furthermore, the encoding order information may include unit codec information. The encoding order information is required for decoding, like the unit codec information.

Meanwhile, the unit codecs of the fixed codec 107 and the Lego-based codec 109, which encode primitive data which are not generated by the primitive data generation unit 101, do not need to perform encoding. The unit codecs of the fixed codec 107 and the Lego-based codec 109 basically have a null value. In this case, the encoding is not performed.

All pass modules included in the fixed codec 107 and the Lego-based codec 109 receive the above-described non-encoded data, and outputs the non-encoded data without encoding. Therefore, the non-encoded data may be referred to as all pass data.

As described above, the bit stream generation unit 111 includes the fixed bit steam generation section 113 and the Lego-based bit stream generation section 115. The fixed bit stream generation section 113 generates a bit stream using the primitive data encoded by the fixed codec 107. Furthermore, the Lego-based bit stream generation section 115 generates a bit stream using the primitive data encoded by the Lego-based codec 109.

That is, the fixed bit stream generation section 113 generates a bit stream including the unit codec information and the primitive data encoded by the fixed codec 107, and the Lego-based bit stream generation section 115 generates a bit stream including the encoding order information and the primitive data encoded by the Lego-based codec 109.

Meanwhile, since the Lego-based codec 109 uses the unit codecs depending on user's setting, the configuration of the bit stream generated by the Lego-based bit stream generation section 115 may be also changed depending on user's setting. Therefore, the bit stream generated by the Lego-based bit stream generation section 115 needs to include bit stream configuration information for decoding. The bit stream configuration information may be generated by the Lego-based codec 109.

In accordance with the above-described embodiment of the present invention, the plurality of primitive data included in 3D contents data are encoded by using different unit codecs, respectively. Therefore, it is possible to encode and decode different kinds of graphic data included in the 3D contents data together. Furthermore, the Lego-based codec 109 may encode data on the basis of an encoding technique which has not existed before, depending on user's setting. Accordingly, it is possible to perform all types of encoding following the all encoding standard, for example, MPEG-4 AFX, MPEG-2 Visual and so on, depending on a combination of unit codecs. That is, the 3D contents data encoding method in accordance with the embodiment of the present invention may encode 3D contents data universally and effectively.

Meanwhile, the 3D contents data encoding apparatus 100 in accordance with the embodiment of the present invention may include only one of the fixed codec 107 and the Lego-based codec 109 depending on the system design. Therefore, the configuration of the bit stream generation unit 111 may be also changed, and the 3D contents data encoding apparatus 100 may not include the encoder selection unit 103. Furthermore, the primitive data generation unit 101, the encoder selection unit 103, the encoder 105, and the bit stream generation unit 111 may be implemented as separate devices.

Figure 2:
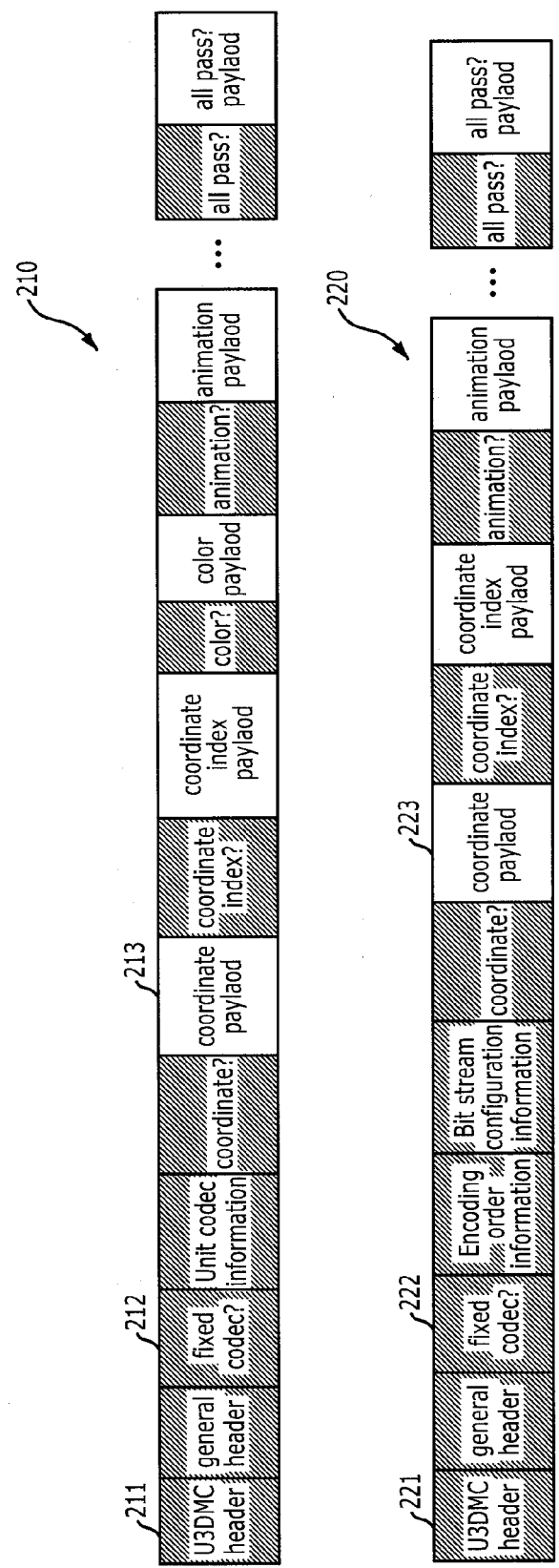
FIG. 2 is a diagram explaining an example of a bit stream described with reference to FIG. 1.

FIG. 2 is a diagram explaining an example of the bit stream described with reference to FIG. 1.

FIG. 2 illustrates a first bit stream 210 generated by the fixed bit stream generation section 113 and a second bit stream 220 generated by the Lego-based bit stream generation section 115. In FIG. 2, hatched portions indicate headers, and non-hatched portions indicate payloads.

First, the similarity between the first and second bit streams 210 and 220 will be described. Then, a difference therebetween will be described.

U3DMC headers 211 and 221 indicate that the bit streams were generated by the 3D contents data encoding apparatus in accordance with the embodiment of the present invention, and fixed codec headers 212 and 222 indicate whether a bit steam was generated by the fixed bit stream generation section 113 or the Lego-based bit stream generation section 115. Furthermore, the first and second bit stream 210 and 220 include payloads corresponding to the encoded primitive data and headers indicating information about the payloads. When the 3D contents data do not include coordinate values, coordinate payloads 213 and 223 have null values.

Meanwhile, the second bit stream 220 does not include a header and a payload about a color value, unlike the first bit stream 210. This depends on bit stream configuration information. Depending on the bit stream configuration information, the second bit stream 220 may include a header and a payload about a color value, like the first bit stream. Furthermore, considering the characteristics of the Lego-based codec 109, the second bit stream 220 may further include the encoding order information and the bit stream configuration information unlike the first bit stream 210.

A 3D contents data decoding apparatus which will be described below may configure unit codecs as a decoder and decode encoded primitive data, by using the unit codec information, the encoding order information, and the bit stream configuration information included in the first and second bit streams 210 and 220.

Meanwhile, the configuration of the bit stream may be changed depending on the system design.

Figure 3:
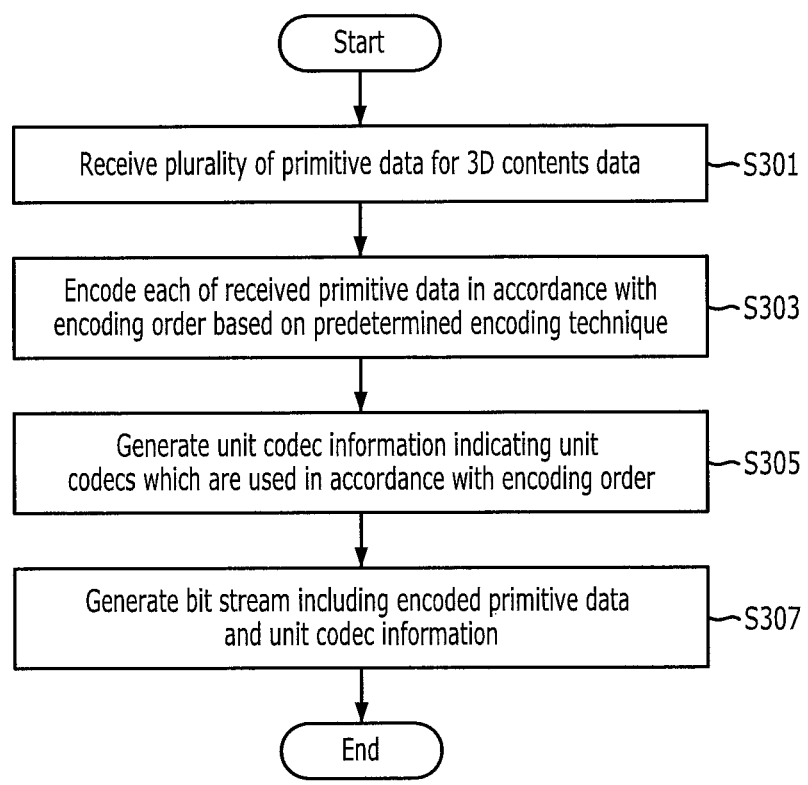
FIGS. 3 and 4 are flow charts explaining a 3D contents data encoding method in accordance with another embodiment of the present invention.
Figure 4:
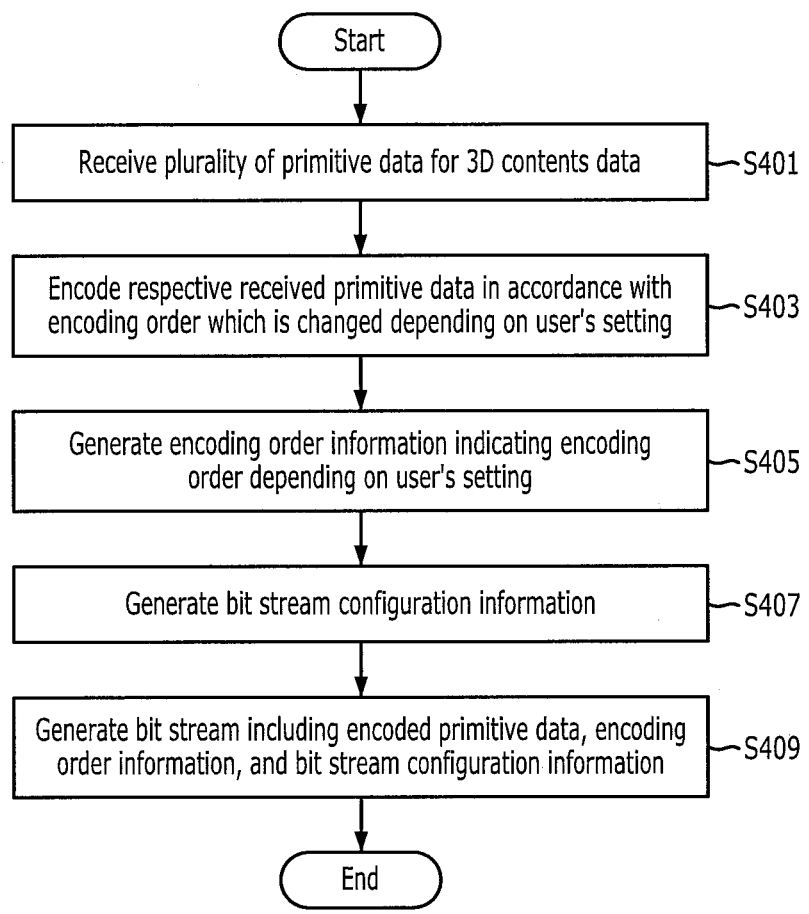

FIGS. 3 and 4 are flow charts explaining a 3D contents data encoding method in accordance with another embodiment of the present invention. In FIGS. 3 and 4, a 3D contents data encoding method of the encoder 105 of FIG. 1 will be described as an example.

In the 3D contents data encoding method in accordance with the embodiment of the present invention, a plurality of primitive data included in 3D contents data are received, and each of the received primitive data is encoded in accordance with a predetermined encoding order for the primitive data. That is, the 3D contents data are encoded for each of the primitive data. At this time, the primitive data is encoded in accordance with the predetermined encoding order. For example, the predetermined encoding order may include an encoding order based on a predetermined encoding technique or an encoding order which is changed depending on user's setting.

Hereafter, FIG. 3 shows the encoding order based on the predetermined encoding technique as an example of the predetermined encoding order, and FIG. 4 shows the encoding order which is changed depending on user's setting as an example of the predetermined encoding order. First, the case of FIG. 3 will be described.

Referring to FIG. 3, the 3D contents data encoding method in accordance with the embodiment of the present invention starts from a step S301. In FIG. 3, a 3D contents data encoding method of the fixed codec 107 will be described as an example.

In the step S301, the fixed codec 107 receives a plurality of primitive data included in 3D contents data. The plurality of primitive data may be inputted from the primitive data generation unit 101.

In a step S303, the fixed codec 107 encodes each of the respective received primitive data in accordance with the encoding order based on the predetermined encoding technique. That is, as described with reference to FIG. 1, the fixed codec 107 encodes each of the primitive data in accordance with the encoding order based on the predetermined encoding technique. At this time, the fixed codec 107 may select unit codecs based on the encoding order from the codec tool library 117 and configure an encoder. For example, the fixed codec 107 may encode the primitive data in order of quantization, predictive coding, and entropy coding.

In a step S305, the fixed codec 107 generates unit codec information indicating the unit codecs which are used in accordance with the encoding order. As described above, the information indicating which unit codecs were used is needed to perform decoding. Therefore, the fixed codec 107 may generate the unit codec information such that decoding is performed. Meanwhile, the unit codec information may be generated by a separate component depending on the system design.

The unit codec information generated by the fixed codec 107 and the encoded primitive data may be generated as a bit stream and transferred to a decoder. The above-described fixed bit stream generation section 113 may generate the bit stream including the unit codec information generated by the fixed codec 107 and the encoded primitive data. Meanwhile, the encoded data may be transferred as another form, not the form of the bit stream, to the decoder depending on the system design.

Referring to FIG. 4, the 3D contents data encoding method in accordance with the embodiment of the present invention starts from a step S401. In FIG. 4, a 3D contents data encoding method of the Lego-based codec 109 will be described as an example.

In a step S401, the Lego-based codec 109 receives a plurality of primitive data included in 3D contents data. The step S401 corresponds to the step S301. In the step S401, the plurality of primitive data may be inputted from the primitive data generation unit 101.

In a step S403, the Lego-based codec 109 encodes the respective received primitive data in accordance with the encoding order which is changed depending on user's setting. That is, as described with reference to FIG. 1, the Lego-based codec 109 configures unit codecs as an encoder, in accordance with the encoding order depending on user's setting. At this time, the Lego-based codec 109 may select the unit codecs based on the encoding order from the codec tool library 117, and configure the encoder.

In a step S405, the Lego-based codec 109 generates encoding order information indicating the encoding order depending on user's setting. As described above, the information about which unit codecs were used is needed to perform decoding. In particular, the Lego-based codec 109 requires the encoding order information for decoding, because the encoding order is changed depending on user's setting. The encoding order information may include the unit codec information indicating the unit codecs which are used in accordance with the encoding order.

In a step S407, the Lego-based codec 109 generates bit stream configuration information. Since the unit codecs are changed depending on user's setting, the Lego-based codec 109 requires the bit stream configuration information for decoding, when the encoded primitive data are converted into a bit stream. Meanwhile, the encoding order information and the bit stream configuration information may be generated by a separate component, depending on the system design.

The encoding order information and the bit stream configuration information, which are generated by the Lego-based codec 109, and the encoded primitive data may be generated as a bit stream and transferred to a decoder. The above-described Lego-based bit stream generation section 115 may generate the bit stream including the encoding order information and the bit stream configuration information, which are generated by the Lego-based codec 109, and the encoded primitive data. Meanwhile, the encoded data may be transferred as another form, not the form of the bit stream, to the decoder depending on the system design.

Meanwhile, the fixed codec 107 and the Lego-based codec 109 may generate null data depending on the primitive data included in the 3D contents data. That is, when a unit codec corresponding to primitive data which are not included in the 3D contents data exists in the fixed codec 107 and the Lego-based codec 109, the fixed codec 107 and the Lego-based codec 109 do not perform encoding, but generate null data to transfer to the fixed and Lego-based bit stream generation sections 113 and 115, respectively.

Figure 5:
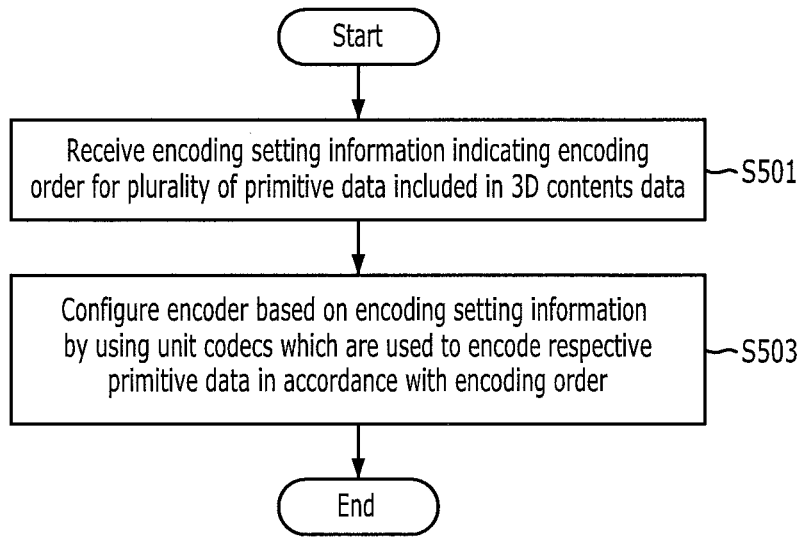
FIG. 5 is a flow chart explaining a 3D contents data encoding method in accordance with another embodiment of the present invention.

FIG. 5 is a flow chart explaining a 3D contents data encoding method in accordance with another embodiment of the present invention. In FIG. 5, a 3D contents data encoding method of the Lego-based codec 109 will be described as an example.

Referring to FIG. 5, the 3D contents data encoding method in accordance with the embodiment of the present invention starts from a step S501.

In the step S501, the Lego-based codec 109 receives encoding setting information indicating an encoding order for a plurality of primitive data included in 3D contents data. The encoding setting information may indicate an encoding order which is changed depending on user's setting.

In a step S503, the Lego-based codec 109 configures an encoder based on the encoding setting information, by using unit codecs which are used to encode the respective primitive data in accordance with the encoding order. At this time, the Lego-based codec 109 may select the unit codecs from the codec tool library 117 to configure the encoder.

The Lego-based codec 109 may encode the plurality of primitive data using the configured encoder. Therefore, in accordance with the embodiment of the present invention, it is possible to encode the 3D contents data depending on user's setting.

Meanwhile, the fixed codec 107 may also configure unit codecs as an encoder depending on the encoding setting information, and encode the primitive data. At this time, the encoding setting information may be an encoding order based on a predetermined encoding technique.

Figure 6:
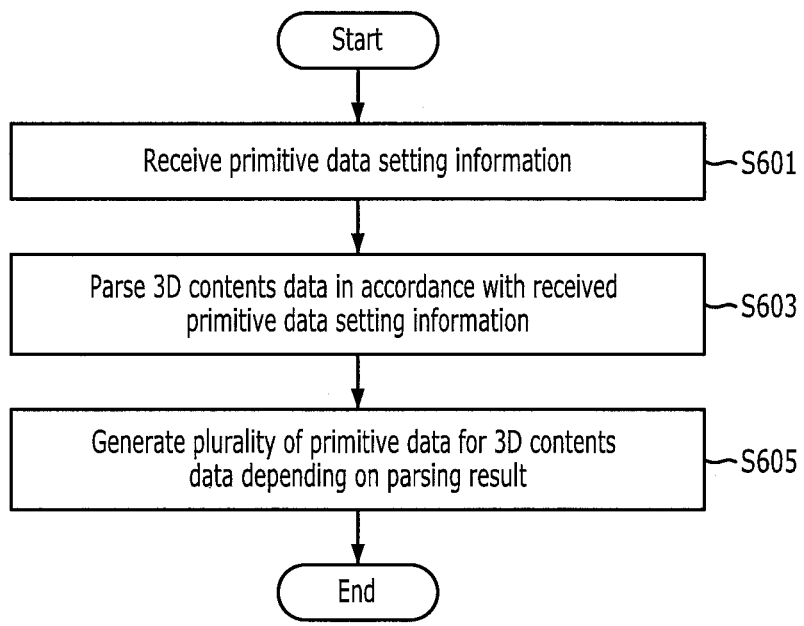
FIG. 6 is a flow chart explaining a 3D contents data encoding method in accordance with another embodiment of the present invention.

FIG. 6 is a flow chart explaining a 3D contents data encoding method in accordance with another embodiment of the present invention. In FIG. 6, a 3D contents data encoding method of the primitive data generation unit 101 will be described as an example.

Referring to FIG. 6, the 3D contents data encoding method in accordance with the embodiment of the present invention starts from a step S601.

In the step S601, the primitive data generation unit 101 receives primitive data setting information. The primitive data setting information indicates as which primitive data 3D contents data are to be generated. That is, the 3D contents data may be generated as a plurality of primitive data depending on the primitive data setting information. Furthermore, the 3D contents data may be generated as primitive data of 2D data, 3D data, and non-encoded data. When animation data is included in the 3D contents data, the animation data may be also generated as primitive data.

In a step S603, the primitive data generation unit 101 parses the 3D contents data in accordance with the received primitive data setting information.

In a step S605, the primitive data generation unit 101 generates a plurality of primitive data for the 3D contents data, depending on the parsing result.

In accordance with the embodiment of the present invention, the plurality of primitive data included in the 3D contents data may be generated, that is, extracted. Furthermore, since each of the generated primitive data may be encoded, the primitive data included in the 3D contents data may be encoded universally and effectively.

Figure 7:
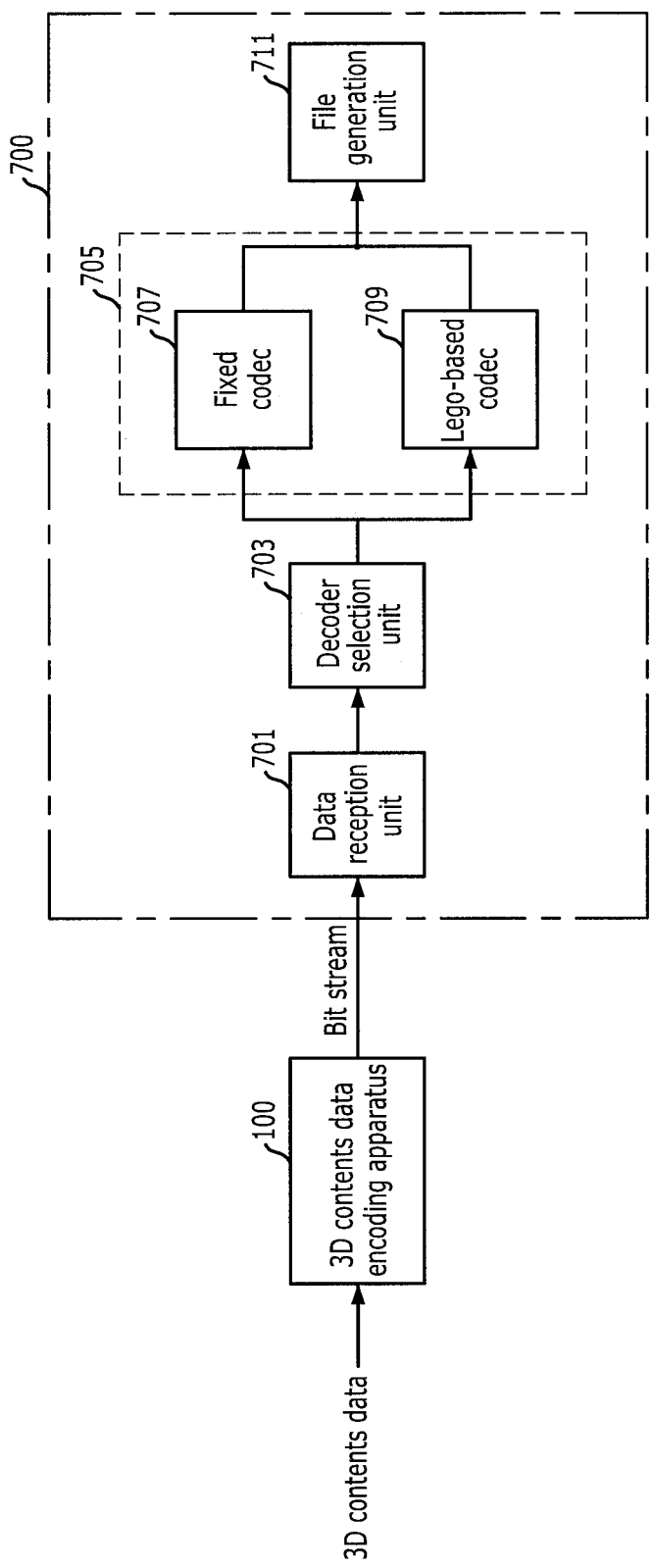
FIG. 7 is a diagram explaining a 3D contents data encoding/decoding system in accordance with another embodiment of the present invention.

FIG. 7 is a diagram explaining a 3D contents data encoding/decoding system in accordance with another embodiment of the present invention.

Referring to FIG. 7, the 3D contents data encoding/decoding system in accordance with the embodiment of the present invention includes the 3D contents data encoding apparatus 100 and a 3D contents data decoding apparatus 700. As described above, the 3D contents data encoding apparatus 100 may receive 3D contents data and generate a bit stream including encoded primitive data.

The 3D contents data decoding apparatus 700 receives the bit stream to perform decoding. The 3D contents data decoding apparatus 700 includes a data reception unit 701, a decoder selection unit 703, a decoder 705, and a file generation unit 707. The decoder 705 includes a fixed codec 707 and a Lego-based codec 709.

Basically, the 3D contents data decoding apparatus 700 has a similar structure to that of the 3D contents data encoding apparatus 100. That is, the 3D contents data decoding apparatus 700 performs decoding in the opposite sequence of the encoding process of the 3D contents data encoding apparatus 100.

The data reception unit 701 receives a bit stream from the 3D contents data encoding apparatus 100. The data reception unit 701 parses the received bit stream. At this time, since the data reception unit 701 does not know the entire structure of the bit stream, the data reception unit 701 may parse only a header portion of the bit stream such that the decoder selection unit 703 determines whether the bit stream was generated by the fixed codec 107 or the Lego-based codec 109.

The decoder selection unit 703 transfers the bit stream received by the data reception unit 701 to the fixed codec 707 or the Lego-based codec 709 using the parsing result of the data reception unit 701. That is, when it is determined that the bit stream was generated by the fixed codec 107, the fixed codec 707 performs decoding. Otherwise, when it is determined that the bit stream was generated by the Lego-based codec 109, the Lego-based codec 709 performs decoding.

The fixed codec 707 and the Lego-based codec 709 decode the bit stream transferred from the decoder selection unit 703. At this time, the fixed codec 707 and the Lego-based codec 709 may select proper unit codecs from a codec tool library or a user codec tool library which is not shown, and configure a decoder, like the 3D contents data encoding apparatus 100.

However, since the decoding may be performed in a different manner depending on the encoding method, the fixed codec 707 and the Lego-based codec 709 performs the decoding by using the unit codec information, the encoding order information, or the bit stream configuration information which is described with reference to FIG. 1. The bit stream may include the encoded primitive data, the unit codec information, the encoding order information, or the bit stream configuration information. The fixed codec 707 and the Lego-based codec 709 may decode the encoded primitive data using the information included in the bit stream.

The file generation unit 711 restores the 3D contents data using the decoded primitive data. That is, the file generation unit 711 generates an original file such as Virtual Reality Modeling Language (VRML) or Collada, using the decoded primitive data.

Meanwhile, the 3D contents data decoding apparatus 700 in accordance with the embodiment of the present invention may include only one of the fixed codec 707 and the Lego-based codec 709, like the 3D contents data encoding apparatus 100. The 3D contents data decoding apparatus 700 may not include the decoder selection unit 703. Furthermore, the data reception unit 701, the decoder selection unit 703, the decoder 705, and the file generation unit 711 may be implemented as separate devices.

Figure 8:
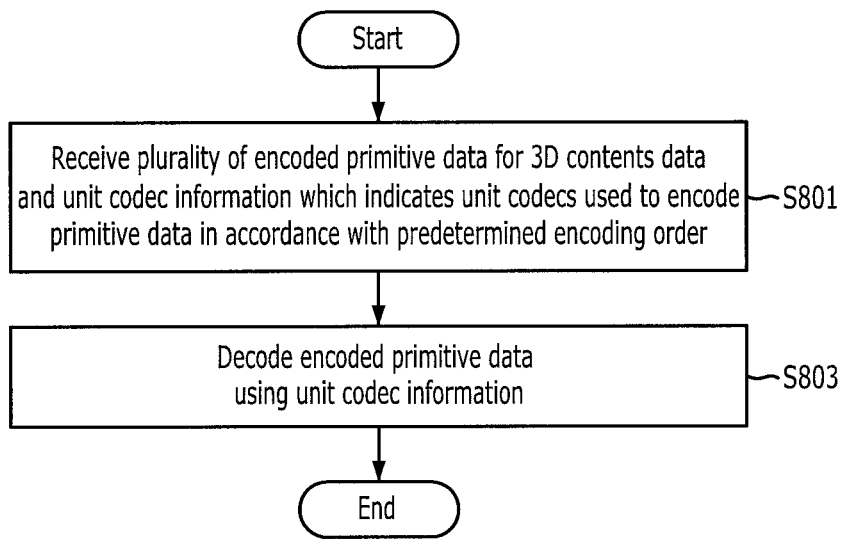
FIG. 8 is a flow chart explaining a 3D contents data decoding method in accordance with another embodiment of the present invention.

FIG. 8 is a flow chart explaining a 3D contents data decoding method in accordance with another embodiment of the present invention. In FIG. 8, a 3D contents data decoding method of the decoder 705 described in FIG. 7 will be described as an example.

Referring to FIG. 8, the 3D contents data decoding method in accordance with the embodiment of the present invention starts from a step S801.

In the step S801, the decoder 705 receives a plurality of encoded primitive data for 3D contents data and unit codec information which indicates unit codecs used to encode the encoded primitive data in accordance with a predetermined encoding order. As described above, the decoder 705 may receive the bit stream received by the data reception unit 701, and the bit stream may be transferred from the 3D contents data encoding apparatus 100.

In a step S803, the decoder 705 decodes the encoded primitive data using the unit codec information. The decoder 705 may select the unit codecs used for the encoding from the codec tool library by using the unit codec information, and configure a decoder using the selected unit codecs.

Meanwhile, in the above-described 3D contents data decoding method, the predetermined encoding order may be an encoding order based on a predetermined encoding technique or an encoding order which is changed depending on user's setting. When the predetermined encoding order is the encoding order which is changed depending on user's setting, the unit codec information may include the encoding order information, and the bit stream may further include the bit stream configuration information.

That is, the fixed codec 707 uses the unit codec information to decode the encoded primitive data in accordance with the encoding order of the predetermined encoding technique. The Lego-based codec 709 uses the unit codec information and the encoding order information to decode the encoded primitive data in accordance with the encoding order of the user's setting. The Lego-based codec 709 may parse the bit stream using the bit stream configuration information, configure the decoder using the unit codec information and the bit stream information, and perform decoding.

Figure 9:
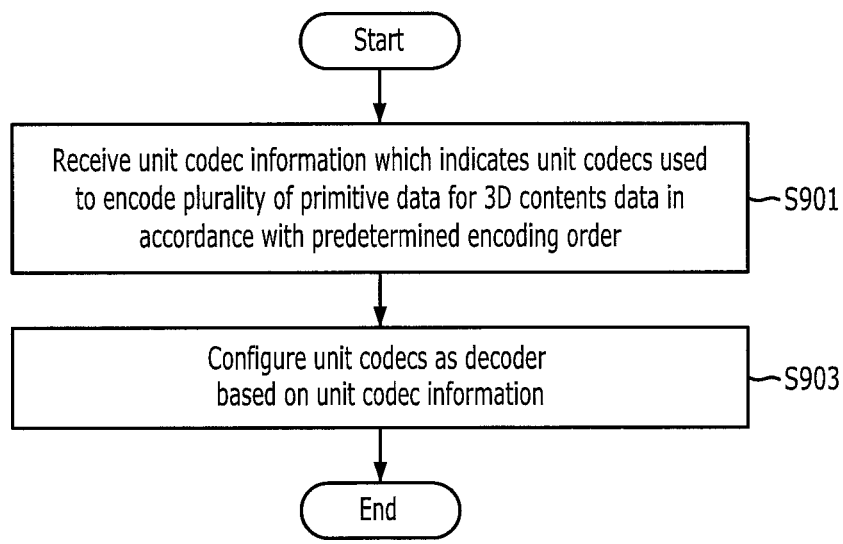
FIG. 9 is a flow chart explaining a 3D contents data decoding method in accordance with another embodiment of the present invention.

FIG. 9 is a flow chart explaining a 3D contents data decoding method in accordance with another embodiment of the present invention. In FIG. 9, a 3D contents data decoding method of the decoder 705 described in FIG. 8 will be described as an example.

Referring to FIG. 9, the 3D contents data decoding method in accordance with the embodiment of the present invention starts from a step S901.

In a step S901, the decoder 705 receives unit codec information which indicates unit codes used to encode a plurality of primitive data for 3D contents data in accordance with a predetermined encoding order. The decoder 705 may receive the unit codec information included in a bit stream transferred from the 3D contents data encoding apparatus 100.

In a step S903, the decoder 705 configures unit codecs as a decoder, based on the unit codec information. The decoder 705 may select the unit codes used for encoding from the codec tool library to configure the decoder.

In the above-described 3D contents data decoding method, the predetermined encoding order may be an encoding order based on a predetermined encoding technique or an encoding order which is changed depending on user's setting. When the predetermined encoding order is the encoding order which is changed depending on user's setting, the unit codec information may include the encoding order information, and the bit stream may further include the bit stream configuration information.

That is, the fixed codec 707 configures the unit codecs as the decoder using the unit codec information depending on the decoding order of the predetermined encoding technique. The Lego-based codec 709 configures the unit codecs as the decoder using the unit codec information and the encoding order information depending on the encoding order of the user's setting.

The above-described embodiments of the present invention have described in terms of the apparatus. However, the respective steps constituting the 3D contents data encoding/decoding method in accordance with the embodiments of the present invention may be easily understood in terms of the apparatus. Therefore, the respective steps included in the 3D contents data encoding/decoding method in accordance with the embodiment of the present invention may be understood as components included in the 3D contents data encoding/decoding system in accordance with the embodiment of the present invention.

That is, the 3D contents data encoding apparatus in accordance with the embodiment of the present invention includes an input unit configured to receive a plurality of primitive data included in 3D contents data and an encoding unit configured to encode each of the received primitive data in accordance with a predetermined encoding order for the primitive data.

Furthermore, the 3D contents data encoding apparatus in accordance with the embodiment of the present invention includes an input unit configured to receive encoding setting information indicating an encoding order for a plurality of primitive data included in 3D contents data; and a configuration unit configured to configure an encoder based on the encoding setting information, by using unit codes which are used to encode the respective primitive data in accordance with the encoding order.

Furthermore, the 3D contents data encoding apparatus in accordance with the embodiment of the present invention includes an input unit configured to receive primitive data setting information; a parsing unit configured to parse 3D contents data in accordance with the received primitive data setting information; and a generation unit configured to generate a plurality of primitive data for the 3D contents data, depending on the parsing result.

Furthermore, the 3D contents data decoding apparatus in accordance with the embodiment of the present invention includes a reception unit configured to receive a plurality of encoded primitive data for 3D contents data and unit codec information which indicates unit codecs used to encode the encoded primitive data in accordance with a predetermined encoding order; and a decoding unit configured to decode the encoded primitive data using the unit codec information.

Furthermore, the 3D contents data decoding apparatus in accordance with the embodiment of the present invention includes a reception unit configured to receive unit codec information which indicates unit codecs used to encode a plurality of primitive data for 3D contents data in accordance with a predetermined encoding order; and a configuration unit configured to configure the unit codes as a decoder based on the unit codec information.

In accordance with the embodiments of the present invention, each of the primitive data for 3D contents data may be encoded and decoded. Therefore, it is possible to encode and decode different kinds of graphic data included in the 3D contents data together.

Furthermore, the unit codecs for encoding and decoding the respective primitive data for the 3D contents data are configured as an encoder or decoder. Therefore, it is possible to encode and decode the 3D contents data depending on user's setting. Furthermore, 3D contents data may be used to generate a plurality of primitive data.

The above-described methods can also be embodied as computer programs. Codes and code segments constituting the programs may be easily construed by computer programmers skilled in the art to which the invention pertains. Furthermore, the created programs may be stored in computer-readable recording media or data storage media and may be read out and executed by the computers. Examples of the computer-readable recording media include any computer-readable recoding media, e.g., intangible media such as carrier waves, as well as tangible media such as CD or DVD.

While the present invention has been described with respect to the specific embodiments, it will be apparent to those skilled in the art that various changes and modifications may be made without departing from the spirit and scope of the invention as defined in the following claims.

What is claimed is:

1. A three-dimensional (3D) contents data encoding method performed by a 3D contents data encoding apparatus, wherein the data encoding apparatus comprises a fixed codec, a Lego-based codec, a fixed bit stream generation section, and a Lego-based bit stream generation section, the method comprising:
receiving a plurality of primitive data contained in 3D contents data;
encoding, by the fixed codec, a first portion of the received primitive data in accordance with a predetermined encoding order;
generating, by the fixed bit stream generation section, a first bit stream comprising a first header and a first payload, wherein the first payload comprises the encoded first portion of the primitive data, and wherein the first header indicates that the first bit stream was generated by the fixed bit stream generation section;
encoding, by the Lego-based codec, a second portion of the received primitive data in accordance with a second encoding order of a user's setting;
generating, by the Lego-based codec, encoding order information which indicates the second encoding order of the user's setting, wherein the encoding order information comprises unit codec information indicating which unit codecs are used in accordance with the second encoding order of the user's setting;
generating, by the Lego-based codec, bit stream configuration information; and
generating, by the Lego-based bit stream generation section, a second bit stream comprising a second header, a third header, a fourth header, and a second payload, wherein the second payload comprises the encoded second portion of the primitive data, the second header indicates that the second bit stream was generated by the Lego-based bit stream generation section, the third header comprises the encoding order information, and the fourth header comprises the bit stream configuration information, and wherein the bit stream configuration information indicates a configuration of the second bit stream.

2. The 3D contents data encoding method of claim 1, wherein, in said encoding the first portion of the received primitive data in accordance with the predetermined encoding order,
the first portion of the received primitive data is encoded in accordance with an encoding order based on a predetermined encoding technique.

3. The 3D contents data encoding method of claim 2, wherein, in said encoding the first portion of the received primitive data in accordance with the predetermined encoding,
the first portion of the received primitive data is encoded in order of quantization, predictive coding, and entropy coding, by using unit codecs which are used in accordance with the predetermined encoding order.

4. The 3D contents data encoding method of claim 2, further comprising:
generating second unit codec information indicating which unit codecs are used in accordance with the predetermined encoding order, and
wherein the generating the first bit stream comprises generating the first bit stream comprising the first header, the first payload, and a fifth header, wherein the fifth header comprises the second unit codec information.

5. The 3D contents data encoding method of claim 1, further comprising:
generating null data depending on the primitive data contained in the 3D contents data, and
wherein the generating the second bit stream comprises generating the second bit stream comprising the second header, the third header, the fourth header, the second payload, and a third payload, wherein the third payload comprises the generated null data.

6. A 3D contents data encoding method performed by a 3D contents data encoding apparatus, wherein the data encoding apparatus comprises a fixed codec, a Lego-based codec, a fixed bit stream generation section, and a Lego-based bit stream generation section, the method comprising:
receiving a plurality of primitive data contained in 3D contents data;
encoding, by the fixed codec, a first portion of the primitive data in accordance with a predetermined encoding order;
generating, by the fixed bit stream generation section, a first bit stream comprising a first header and a first payload, wherein the first payload comprises the encoded first portion of the primitive data, and wherein the first header indicates that the first bit stream was generated by the fixed bit stream generation section;
receiving encoding setting information which indicates a second encoding order for a second portion of the primitive data, wherein the second encoding order indicates an encoding order of a user's setting;
configuring the Lego-based codec based on the encoding setting information by using unit codecs which are used to encode the respective second portion of the primitive data in accordance with the second encoding order;
encoding, by the Lego-based codec, the second portion of the primitive data in accordance with the second encoding order;
generating, by the Lego-based codec, encoding order information which indicates the second encoding order of the user's setting, wherein the encoding order information comprises unit codec information indicating which unit codecs are used in accordance with the second encoding order of the user's setting;
generating, by the Lego-based codec, bit stream configuration information; and
generating, by the Lego-based bit stream generation section, a second bit stream comprising a second header, a third header, a fourth header, and a second payload, wherein the second payload comprises the encoded second portion of the primitive data, the second header indicates that the second bit stream was generated by the Lego-based bit stream generation section, the third header comprises the encoding order information, and the fourth header comprises the bit stream configuration information, and wherein the bit stream configuration information indicates a configuration of the second bit stream.

7. A 3D contents data encoding method performed by a 3D contents data encoding apparatus, wherein the data encoding apparatus comprises a fixed codec, a Lego-based codec, a fixed bit stream generation section, and a Lego-based bit stream generation section, the method comprising:
receiving primitive data setting information;
parsing 3D contents data in accordance with the received primitive data setting information;
generating a plurality of primitive data for the 3D contents data, depending on the parsing result;

encoding, by the fixed codec, a first portion of the primitive data in accordance with a predetermined encoding order;

generating, by the fixed bit stream generation section, a first bit stream comprising a first header and a first payload, wherein the first payload comprises the encoded first portion of the primitive data, and wherein the first header indicates that the first bit stream was generated by the fixed bit stream generation section;

encoding, by the Lego-based codec, a second portion of the primitive data in accordance with a second encoding order of a user's setting;

generating, by the Lego-based codec, encoding order information which indicates the second encoding order of the user's setting, wherein the encoding order information comprises unit codec information indicating which unit codecs are used in accordance with the second encoding order of the user's setting;

generating, by the Lego-based codec, bit stream configuration information; and generating, by the Lego-based bit stream generation section, a second bit stream comprising a second header, a third header, a fourth header, and a second payload, wherein the second payload comprises the encoded second portion of the primitive data, the second header indicates that the second bit stream was generated by the Lego-based bit stream generation section, the third header comprises the encoding order information, and the fourth header comprises the bit stream configuration information, and wherein the bit stream configuration information indicates a configuration of the second bit stream.

8. The 3D contents data encoding method of claim 7, wherein the primitive data setting information is used to generate 2D data, 3D data, and non-encoded data contained in the 3D contents data as the primitive data.

9. A 3D contents data decoding method performed by a 3D contents data decoding apparatus, wherein the data decoding apparatus comprises a fixed codec and a Lego-based codec, the method comprising:

receiving a first bit stream comprising a first header and a first payload, wherein the first payload comprises an encoded first portion of primitive data for 3D contents data, and wherein the first header indicates that the first bit stream was generated by a fixed bit stream generation section of a 3D contents data encoding apparatus;

transferring the first bit stream to the fixed codec based on the first header indicating that the first bit stream was generated by the fixed bit stream generation section of the data encoding apparatus;

decoding, by the fixed codec, the encoded first portion of the primitive data;

receiving a second bit stream comprising a second header, a third header, a fourth header, and a second payload, wherein the second payload comprises an encoded second portion of the primitive data, the second header indicates that the second bit stream was generated by a Lego-based bit stream generation section of the data encoding apparatus, the third header comprises encoding order information, and the fourth header comprises bit stream configuration information, wherein the bit stream configuration information indicates a configuration of the second bit stream, wherein the encoding order information indicates an encoding order of a user's setting, and wherein the encoding order information comprises unit codec information which indicates which unit codecs were used to encode the encoded second portion of the primitive data in accordance with the encoding order of the user's setting;

transferring the second bit stream to the Lego-based codec based on the second header indicating that the second bit stream was generated by the Lego-based bit stream generation section of the data encoding apparatus; and decoding, by the Lego-based codec, the encoded second portion of the primitive data using the encoding order information and the bit stream configuration information.

10. A 3D contents data decoding method performed by a 3D contents data decoding apparatus, wherein the data decoding apparatus comprises a fixed codec and a Lego-based codec, the method comprising:

receiving a first bit stream comprising a first header and a first payload, wherein the first payload comprises an encoded first portion of primitive data for 3D contents data, and wherein the first header indicates that the first bit stream was generated by a fixed bit stream generation section of a 3D contents data encoding apparatus;

transferring the first bit stream to the fixed codec based on the first header indicating that the first bit stream was generated by the fixed bit stream generation section of the data encoding apparatus;

decoding, by the fixed codec, the encoded first portion of the primitive data;

receiving a second bit stream comprising a second header, a third header, a fourth header, and a second payload, wherein the second payload comprises an encoded second portion of the primitive data, the second header indicates that the second bit stream was generated by a Lego-based bit stream generation section of the data encoding apparatus, the third header comprises encoding order information, and the fourth header comprises bit stream configuration information, wherein the bit stream configuration information indicates a configuration of the second bit stream, wherein the encoding order information indicates an encoding order of a user's setting, and wherein the encoding order information comprises unit codec information which indicates which unit codecs were used to encode the encoded second portion of the primitive data in accordance with the encoding order of the user's setting;

configuring unit codecs in the Lego-based codec based on the encoding order information and the unit codec information;

transferring the second bit stream to the Lego-based codec based on the second header indicating that the second bit stream was generated by the Lego-based bit stream generation section of the data encoding apparatus; and decoding, by the Lego-based codec, the encoded second portion of the primitive data using the encoding order information and the bit stream configuration information.

* * * * *